April 2, 1946.  H. BONBRIGHT  2,397,526
AIRCRAFT
Filed Jan. 12, 1942  2 Sheets-Sheet 1
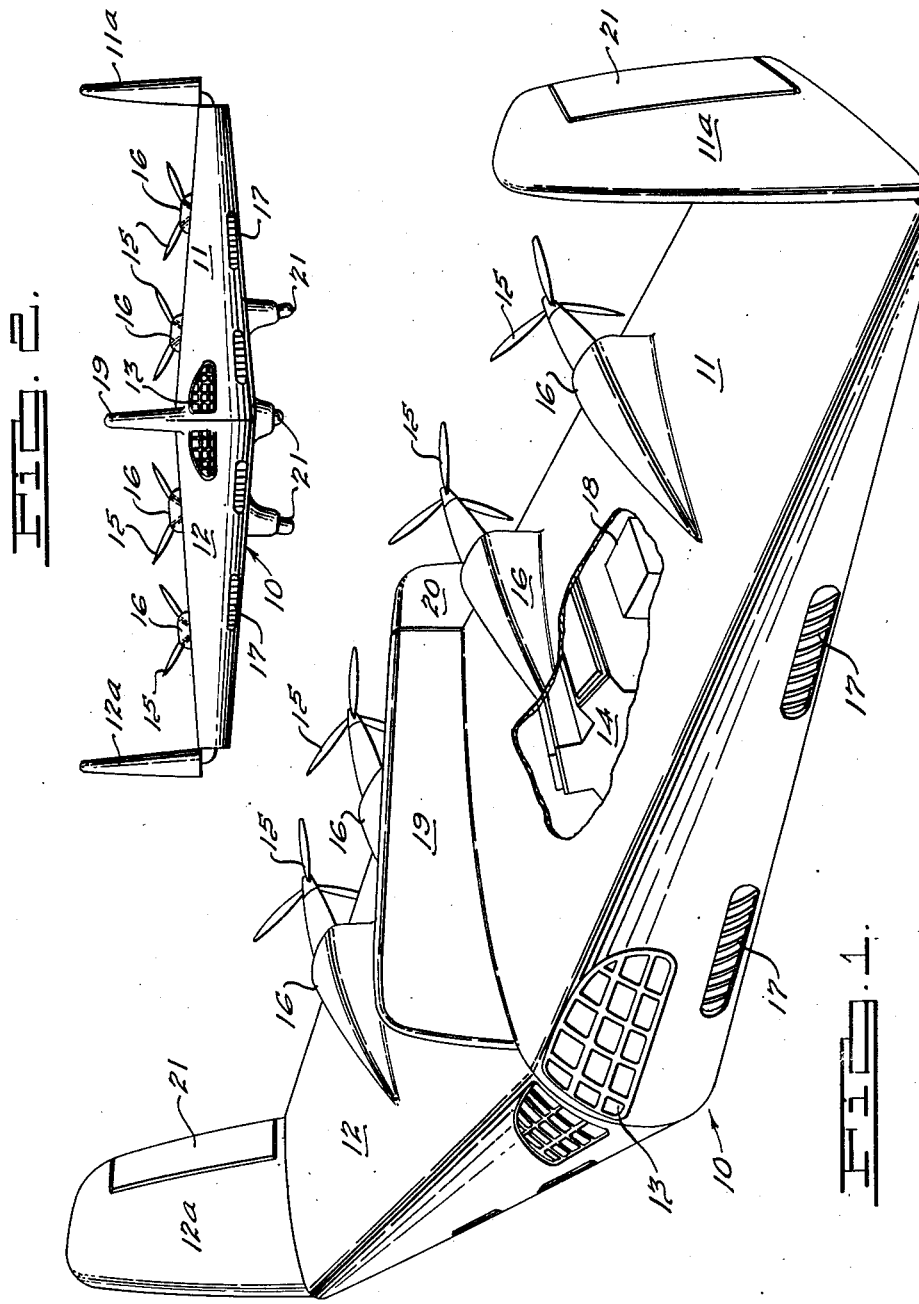
INVENTOR
Howard Bonbright.
BY Gray and Smith
ATTORNEYS.

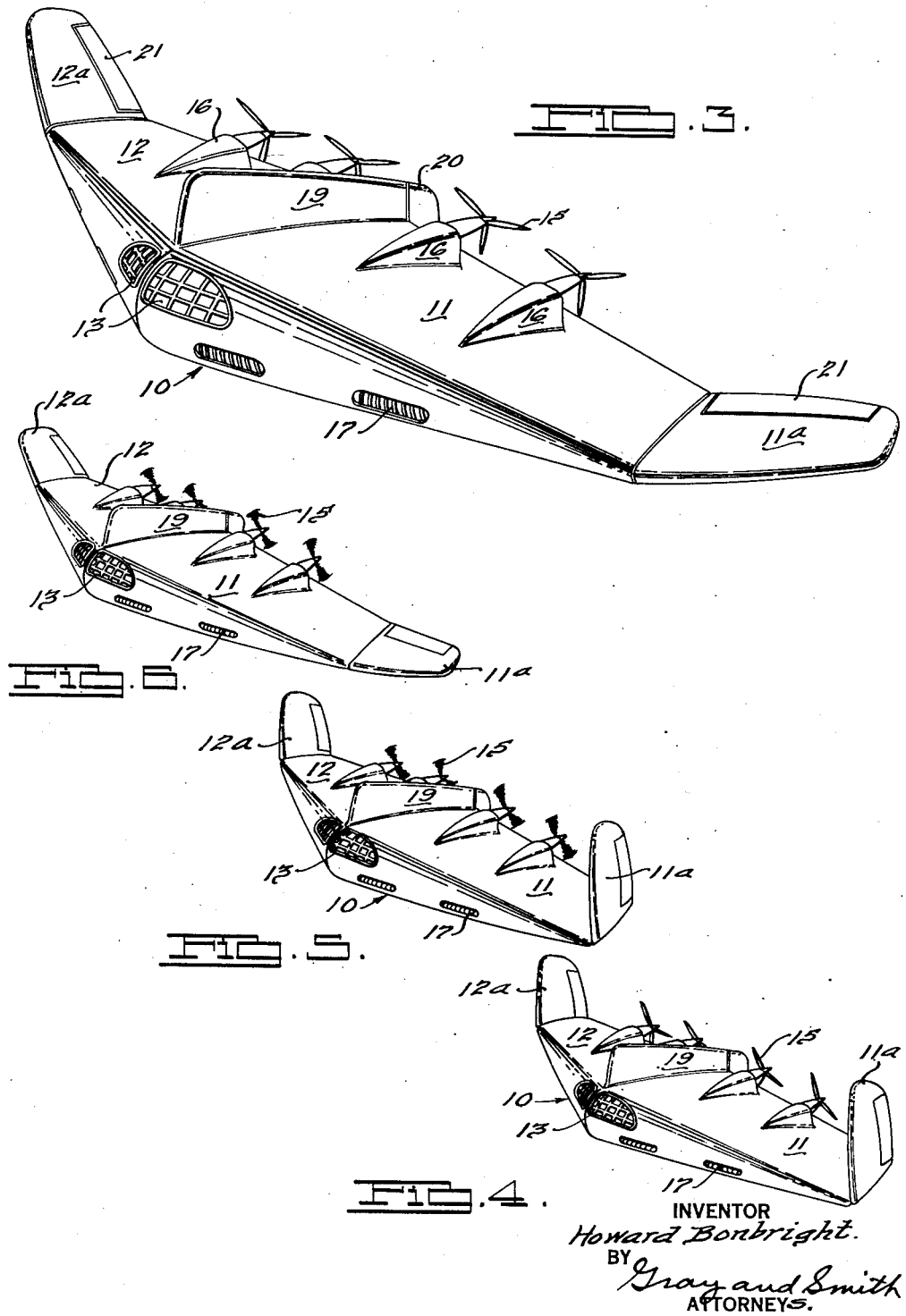

Patented Apr. 2, 1946

2,397,526

UNITED STATES PATENT OFFICE 2,397,526

AIRCRAFT

Howard Bonbright, Grosse Pointe, Mich., assignor to Briggs Manufacturing Company, Detroit, Mich., a corporation of Michigan Application January 12, 1942, Serial No. 426,460

5 Claims. (Cl. 244—12)

This invention relates to airplanes of the vertical lift type and more particularly it is adapted for use in connection with the type of airplane generally known as the "flying wing" which is an aircraft substantially entirely without tail surfaces. Considerable research and development work in connection with this type of aircraft has been undertaken in the past on account of the desirable advantages which may be obtained from the use of the so-called flying wing principle in connection with airplanes constructed not only for military purposes but also for general usage. In the development of this type of aircraft much effort has been directed to the control of the airplane during operation and although considerable success appears thus far to have been achieved in this direction, little or no effort has been successfully directed to increasing the vertical lift of the airplane during take-off over that of any conventional type of aircraft or in decreasing materially the run-way area conventionally necessary for taking off and landing. Thus, in perfecting this type of airplane the energies of engineers have been primarily directed toward the solution of problems encountered in the control of the airplane under flight conditions so that it will have the desired flexibility in maneuvering under various conditions of operation.

One of the principal purposes of the present invention is to improve the lifting power of the foregoing type of aircraft and also to improve the construction thereof so that it may be controlled to the best advantage under all conditions of operation. In connection with the improvement in the lifting power achieved by virtue of the present invention an important object of the invention is to arrange the propeller or propellers and to construct the body or wing structure of the airplane in such manner as to enable the airplane to take off from the ground and also to land within a much smaller area than heretofore. In other words, by applying the invention to aircraft of the tailless type it is possible for the airplane to rise from the ground sooner than heretofore in a more nearly vertical direction and to land correspondingly. The ultimate purpose of the invention is to provide an airplane of this type which can be more nearly dependent upon the propellers rather than the forward travel of the airplane along the ground to effect the lifting of the airplane from the ground, and the preferred construction is such that the airplane, when the propeller speed is sufficient, will rise or descend in a generally vertical direction while properly controlled so as to maintain an even or nearly even keel.

The advantages of an airplane which will rise and descend vertically or substantially vertically while remaining on an even keel are well known. Some of the many desirable features of such an aircraft would include its ability to land on and take off from comparatively small ground or landing areas, the material reduction of accidents and hazards during take off and landing operations, the assurance of a more safe aircraft during flight in all weather conditions and the many advantages incident to the adoption of its use for military purposes.

Thus, it is a primary object of the present invention to provide an airplane of the tailless or flying wing type which will rise and descend substantially vertically while remaining on an even keel or in a nearly normal horizontal flight position.

It is another object of the invention to provide an airplane of the foregoing type which will rise and descend vertically while remaining on an even keel, the vertical lift being accomplished by creating through the operation of the propellers a vacuum or sub-atmospheric air pressure in the vicinity immediately above the wing surfaces.

Another object of the invention is to provide an airplane of the vertical lift type which is substantially entirely without fuselage or tail surfaces and in which there is a complete absence of drag or parasitic resistance in flight.

A further object of the invention is to provide an airplane of the flying wing type having no fuselage or tail surfaces, which will rise and descend substantially vertically while remaining on an even keel, means being associated with the wings of said airplane to form an air pocket or pockets located immediately in advance of the propeller or propellers for effecting vertical rise of the airplane.

Another object of the invention is to provide an airplane of the tailless or flying wing type having means mounted on the wing surfaces thereof and associated with the propeller or propellers to effect vertical rise, flight propulsion and vertical landing of the airplane.

Still a further object of the invention is to provide a vertical lift airplane of the flying wing type having no fuselage or tail surfaces, air suction means being provided on said airplane adjacent the wings and means being associated with the wings to form an air pocket for effecting vertical rise of the airplane upon predetermined rotational operation of the propeller.

Other objects of this invention will appear in the following description and appended claims, reference being had to the accompanying drawings forming a part of this specification wherein like reference characters designate corresponding parts in the several views.

Fig. 1 is a perspective view of an airplane of the flying wing type which embodies the present invention.

Fig. 2 is an elevated view of the airplane as shown in Fig. 1.

Fig. 3 is a perspective view of an airplane of the flying wing type shown in Fig. 1 in horizontal flight position.

Fig. 4 is a perspective view similar to Fig. 1 illustrating an airplane of the flying wing type in position preparatory to the initial take off.

Fig. 5 is a perspective view illustrating the airplane shown in Fig. 4 in a vertical lifting position.

Fig. 6 is a perspective view similar to Fig. 3 illustrating the airplane shown in Figs. 4 and 5 having attained the desired altitude and in horizontal flight position.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

There is illustrated in Figs. 1 and 2 an airplane of the flying wing or tailless type in which all functions of the airplane are combined into one large airfoil 10 having a thickness in the foreportion of its mid section of approximately 7 to 8 feet. The airfoil is divided into two wing sections or segments 11 and 12. Each wing segment or section tapers outwardly from the central portion or mid section of the airfoil. The leading edges of the wing segments 11 and 12 sweep back from the mid section of the airfoil at an approximate 45° angle and taper from the said leading edges to the trailing edges. In its mid section substantially at the foreportion thereof a passenger compartment 13 is provided and is housed entirely within the contours of the airfoil.

Four internal combustion engines 14 of any suitable type are buried or housed within the wing segments 11 and 12 and are drivingly connected with pusher type propellers 15 through the medium of drive shafts housed within propeller drive shaft housings 16 which extend above and to the rear of the wing segments 11 and 12. It is to be noted that the propellers 15 are positioned so that the propeller tips extend slightly below and very close to the trailing edges of the wing segments 11 and 12. Suitable air intake ports 17 are provided at spaced intervals along the leading edges of the wing segments 11 and 12 through which air is supplied to the internal combustion engines 14. The wing sections or segments 11 and 12 are provided at their outer ends with tiltable wing tips or fins 11a and 12a. Each of the wing tips 11a and 12a is operated by means of interconnected pulleys and shafts (not shown) connected to a suitable hydraulic device 18 located within the wing structure. The control of the hydraulic devices is preferably such as to permit the operator to actuate the tips or vanes 11a and 12a independently of each other in order to obtain the greatest flexibility in maneuvering the airplane during flight. The wing tips or fins 11a and 12a are controlled by an operator from the passenger compartment through the medium of suitable controls.

When the airplane is rising or descending the normal position of the wing tips 11a and 12a is in a vertical or upright position as shown in Figs. 1 and 2. During the forward flight of the airplane the wing tips are lowered to the slightly tilted positions as shown in Figs. 3 and 6. The airfoil is provided further at its center upon the upper surfaces thereof with a relatively narrow upright vane or fin 19 extending from the foreportion of the airfoil to its aft portion. A laterally swingable rudder 20 is operably secured to the fin 19. If desired, pivoted fins 21 may be provided on the wing tips or members 11a and 12a. Depending from the bottom of the airfoil is a landing gear generally designated as 21 and which may be of any suitable retractible type. Since the present invention does not comprehend per se an airplane of the flying wing or tailless type, the description herein given of known features of this particular type of aircraft is merely for purposes of illustration, it being understood that any suitable type of tailless airplane may be used in which controllability and stability about all three axes is obtained through the shape of the wing rather than principally through the use of external fins, rudders, stabilizers or other auxiliary surfaces.

As hereinbefore stated, it is the purpose of the invention to create a vacuum or low pressure area above the wing segments of sufficient magnitude to effect a vertical lift of the airplane. It is well known that when a propeller is turning there is a lower pressure area directly ahead of it in the direction of the flight. The velocity of the air currents directly in front of the propeller, naturally, depends upon the rotational speed or R. P. M. of the propeller. The greater R. P. M. of the propeller, the greater amount of air is removed from the area directly ahead of the propeller. Up to the present time no practical use has been made of this condition and atmospheric pressure has always been permitted to rush in all around the propeller to relieve this low pressure area as fast as possible since thrust has been the paramount consideration in forcing or driving the airplane ahead as quickly and as fast as possible.

By interfering with the atmospheric pressure rushing in from every angle or direction, a condition may be made to exist that will lift the weight of the plane. As illustrated in the accompanying drawings this has been accomplished by placing the trailing edge of the wing sections 11 and 12 close to and immediately in front of the propellers at a point of turbulence approximately two thirds of the distance from the center of the hub of the propeller to its tip and below the hub. By the placement of the propellers 15 in such a manner close to the trailing edge of the wing segments 11 and 12 relief of the low pressure area from atmospheric pressure below is effectively blocked. It is known also that when the propeller turns up to higher speeds the low pressure areas directly ahead of the propellers 15 have a tendency to fan out towards both edges of each of the wing segments 11 and 12 as well as forging ahead towards the leading edges.

By the provision of the fin 19 and the tiltable fins or wing tips 11a and 11b it is possible to further obstruct atmospheric pressure from rushing in from the sides to relieve the low pressure area thereby assisting in causing the vacuum or low pressure area to extend over the entire surfaces of the wing segments from the wing tips 11a and 11b to the center fin 19 and from the leading edges to the trailing edges of the wing segments.

When the wing tips 11a and 11b are tilted in a vertical position such as shown in Figs. 1 and 2 and the propellers are turning from about 2,500 to 3,500 R. P. M. a low pressure area of tornado proportion is created over the wing sections which can be increased or lessened by varying the R. P. M. of the propeller. A condition thus exists over the wing section as it does above any wing area in flight only in greater proportion per square foot, and the exertion of pressure under the wing sections by the atmosphere greatly exceeds the weight of the structure causing the airplane to lift vertically.

There is shown in Fig. 4 an airplane of the flying wing type in a stationary position on the ground. In this position the wing tips 11a and 12a are normally vertically tilted. When torque is applied to the propellers so that the propellers are turning at the rate of about 1,000 R. P. M. air pressure begins to be removed from the upper surfaces of the wing segments 11 and 12. At about 1,500 R. P. M. the wing sections cease to weigh anything as the atmospheric pressure under the wing sections exceeds the weight of said sections. Above approximately 1,500 R. P. M. this condition continues to increase and the airplane rises as shown in Fig. 5. When the desired altitude is attained the wing tips are lowered to the position shown in Figs. 3 and 6 which permits atmospheric pressure to rush in and dissipate the vacuum or low pressure area created over the top wing surfaces and the airplane then proceeds in horizontal flight.

If it is desired that the airplane descend, the reverse operations take place. The airplane having reached a point in horizontal flight where the pilot desires to descend, the wing tips are tilted upwardly in a vertical position arresting the forward motion of the plane. The speed of the propellers is then gradually lessened thus causing the airplane to settle slowly to the ground finally resting in the position as shown in Fig. 4.

I claim:

1. An airplane comprising an airfoil constructed to form the supporting body and passenger compartment of the airplane, propeller means arranged in close proximity to the trailing edge of the airfoil and positioned to produce a blast of air over the upper surface of the airfoil, said airfoil having tips adapted to extend upwardly to form, in conjunction with adjacent portions of the airfoil, a longitudinal channel for confining the air blast produced by the propeller means, said tips being adjustable to approximately a horizontal position to improve the forward flight characteristics of the airplane.

2. An airplane comprising an airfoil constructed to form the supporting body and passenger compartment of the airplane, propeller means arranged in close proximity to the trailing edge of the airfoil and positioned to produce a blast of air over the upper surface of the airfoil, said airfoil having a tip adapted to extend upwardly to form, in conjunction with an adjacent portion of the airfoil a longitudinal channel for confining the air blast produced by the propeller means, said tip being adjustable toward horizontal position to change the flight characteristics of the airplane.

3. An airplane comprising an airfoil constructed to form a supporting body and passenger compartment of the airplane, a central upwardly extending longitudinal fin dividing said airfoil into two wing sections, a plurality of propellers arranged adjacent the trailing edges of the wing sections and positioned to produce blasts of air over the upper surfaces of the wing sections, said sections having tips adapted to extend upwardly to form in conjunction with said fin longitudinal channels for confining the air blasts produced by said propellers, said tips being adjustable toward horizontal position to change the flight characteristics of the airplane.

4. An airplane comprising an airfoil constructed to form a supporting body and passenger compartment of the airplane, a central upwardly extending longitudinal fin dividing said airfoil into two wing sections, a plurality of propellers arranged adjacent the trailing edges of the wing sections and positioned to produce blasts of air over the upper surfaces of the wing sections, said sections having tips adapted to be tilted upwardly to form in conjunction with said fin longitudinal channels for confining the air blasts produced by said propellers, said tips being tiltable toward horizontal position to change the flight characteristics of the airplane.

5. An airplane comprising an airfoil constructed to form a supporting body and passenger compartment of the airplane, a central upwardly extending longitudinal fin dividing said airfoil into two wing sections, a plurality of propellers arranged adjacent the trailing edges of the wing sections, said sections having tips forming in conjunction with said fin longitudinal channels through which and over the upper surfaces of said wing sections said propellers when rotating are adapted to direct air blasts capable of producing a low pressure area of sufficient magnitude immediately above the entire upper surfaces of said wing sections in advance of the propellers to effect vertical lift of the airplane, said tips being adjustable toward horizontal position to change the flight characteristics of the airplane.

HOWARD BONBRIGHT.